Patented Mar. 26, 1929.

1,706,639

UNITED STATES PATENT OFFICE.

ROBERT H. VAN SCHAACK, JR., OF EVANSTON, AND ROBERT CALVERT, OF WILMETTE, ILLINOIS, ASSIGNORS TO VAN SCHAACK BROS. CHEMICAL WORKS, INC., OF CHICAGO, ILLINOIS, A CORPORATION OF ILLINOIS.

ALKOXY ESTERS OF POLYBASIC ORGANIC ACIDS.

No Drawing.    Application filed October 31, 1927. Serial No. 230,181.

This invention relates to a composition of matter comprising an alkoxy ester of a polybasic organic acid.

An example of the invention is diethoxy-ethyl phthalate,

a colorless liquid of remarkably low volatility and of excellent solvent powers for pyroxylin and, therefore, of value as a plasticizer in lacquers.

This compound may be made as follows: 148 parts by weight of phthalic anhydride is digested for six hours with 200 parts of glycol monoethyl ether ($HO.CH_2.CH_2.OC_2H_5$) and 5 parts of concentrated sulfuric acid.

The following reaction occurs:

If the digestion is conducted under a fractionating column, the top of which is allowed to rise to or just slightly above the boiling point of water, the water formed may be continuously removed and the reaction thus permitted to proceed until nearly all of the phthalic anhydride is esterified.

After a large part of the phthalic anhydride is esterified, the mixture is made substantially neutral by agitation with an aqueous solution of 10 pounds of sodium carbonate in 100 pounds of water, washed, by agitation with water, and then submitted to vacuum distillation. A fraction containing such impurities as water, uncombined glycol monoethyl ether, and free phthalic anhydride is first obtained. Then there is obtained a fraction boiling at 205° C. at a pressure equal approximately to 4 mm. of mercury. This fraction contains diethoxyethyl phthalate. To purify the fraction, it may be neutralized as before, washed with water, and redistilled in vacuo, the foreshot being again discarded. The fraction boiling at 200–2° C. at approximately 4 mm. is diethoxy ethyl phthalate.

In another preparation there was used 146 parts by weight of phthalic anhydride, 216 parts ethoxyethanol (glycol monoethyl ether), 10 parts sulfuric acid, and 200 parts benzene. The mixture was heated to boiling and kept boiling for 5 hours. The vapors formed were passed up through a tube and then down through a water-cooled condenser. The condensate was collected in a receiver from which the lower, aqueous layer was withdrawn from the bottom and the upper layer returned to still. After 5 hours it was found that 22.4 parts of lower layer had been collected and that only 4.2% of the total, original acidity remained. In other words, 95.8% of the phthalic anhydride had been esterified. The reaction mixture was then neutralized with an excess of sodium carbonate above that required for the free acidity. The neutralized product was then distilled in vacuo. The main fraction, boiling at 200–211° C. at approximately 4 mm. of mercury pressure, amounted to 186 parts and consisted of diethoxy ethyl phthalate of such purity as to constitute a desirable plasticizer for lacquer.

Details of the method of preparation may be varied. Also, we may use some other alkoxy alcohol than ethoxyethanol. Thus we may use, for example, butoxyethanol

ethoxypropanol

or ethoxy-secondary-butanol

We may use the alkoxy alcohol in amount equivalent to or in excess of the phthalic anhydride, to esterify both of the acidic groups of phthalic acid (or phthalic anhydride). Or, we may use only enough of the alkoxy alcohol to form alkoxyalkyl hydrogen phthalate, the esterification of the remaining carboxyl group of which may be completed with some other alcohol. The second alcohol may be some other alkoxy alcohol, an aromatic alcohol, as, for example, benzyl alcohol, or an aliphatic alcohol, as, for example ethyl, isopropyl, butyl, or amyl alcohol.

To prepare butyl ethoxyethyl phthalate, for example, we may proceed as follows:

Monobutyl phthalate was first prepared from 148 g. of phthalic anhydride and 75 g. of butyl alcohol by warming them together for a few minutes in the presence of 50 cc. of benzene and ½% of $H_2SO_4$. Then 90 g. of ethoxy ethyl alcohol was added and the mixture was heated 8 hours at a temperature of 123° to 150° C. with continual removal by fractionation of the water formed during the reaction. At the end of that time the acidity due to organic acid had fallen to 1.3%. The reaction product was washed several times with a dilute solution of $Na_2CO_3$ and then with water. It was dried with anhydrous $Na_2SO_4$. The benzene and any other materials which had a low boiling point were distilled off at 40 mm. pressure. The remainder was distilled under greatly reduced pressure. The principal fraction distilled at 182°–185° C. at approximately 5 mm. pressure.

The butyl ethoxyethyl phthalate was a clear colorless liquid of which 1 cc. weighed 1.08 g. at 20° C.

Also, I may use some other dibasic acid than phthalic or a polybasic acid. Thus I may use citric, tartaric, succinic, phenyl malonic acid, or trimesic acid, $C_6H_3(COOH)_3$.

Some specific examples and type formulas of the compounds within the scope of my invention follow:

1. $C_6H_4(COO.CH_2.CH_2.OC_2H_5)_2$

Diethoxyethyl phthalate

2. $R^1(COO.CH_2.CH_2.OC_2H_5)_2$, in which $R^1$ represents any divalent group of atoms comprising carbon and hydrogen.

3. $R^2(COO.CH_2.CH_2.OC_2H_5)x$, in which $R^2$ represents any polyvalent group of atoms comprising carbon and hydrogen and $x$ represents an integral number which is not less than 3.

4. $C_6H_4(COO.CH(CH_3).CH_2.CH_2.OC_2H_5)_2$

Di-ethoxy-secondary-butyl phthalate.

5. 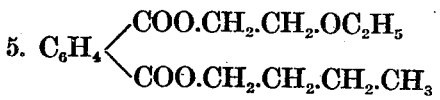

Ethoxyethyl butyl phthalate

6. 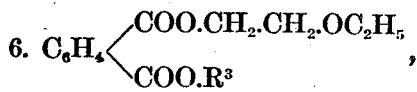

in which $R^3$ represents any monovalent hydrocarbon group such, for example, as methyl, ethyl, isopropyl, butyl, isoamyl, amyl, hexyl, or benzyl.

7. 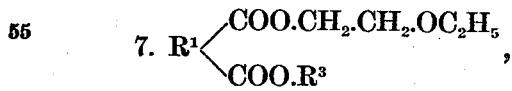

in which $R^1$ and $R^3$ represent respectively the radicals as above stated.

8. 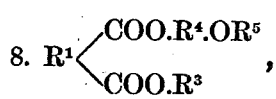

in which $R^1$ and $R^3$ represent respectively the radicals as above stated, $R^4$ represents any divalent and $R^5$ any monovalent group of carbon and hydrogen atoms. Thus $R^4$ may be an alkylene radical, as, for example, $-CH_2.CH_2-$, $-CH_2.CH_2.CH_2-$,
$-CH(CH_3).CH_2.CH_2-$, or
$-CH_2.CH(CH_3).CH_2.CH_2-$, and $R^5$ may be an alkyl radical, as for example, $-CH_3$, $-C_2H_5$, $-C_3H_7$, $-C_4H_9$, $-C_5H_{11}$, etc.

9. Compounds of the type described in Example No. 8 but in which $R^4$ represents specifically the group $-CH_2.CH_2-$, as, for example, in the following:

Diethyoxyethyl succinate

Ethoxyethyl butyl succinate

10. 

Triethoxyethyl citrate

11. 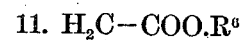
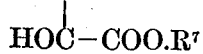
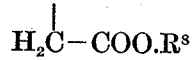

A citrate in which $R^6$ represents an alkoxyalkyl, alkoxyaryl, or aryloxyaryl radical and $R^7$ and $R^8$ represent either additional radicals of the same type or alykyl or aryl radicals, no one radical containing more than eight carbon atoms.

The various compounds may be made from the esterification of the acid, whose radical appears in the final product, with the alkoxy alcohol, aryloxy alcohols, or other alcohol whose radicals are also in the final product. The technique of such esterifications and means of purification have been illustrated by specific examples.

When the radicals $R^1$ to $R^8$ inclusive contain each not more than four carbon atoms, in addition to those carbons occurring in a benzene ring, the esters described, in liquid form, are excellent solvents for pyroxylin, with which they may be used as a plasticizer. The great majority of these esters are liquids at ordinary temperatures or melt at a lower temperature than camphor, which they may substitute to advantage.

The following illustrations show compositions comprising pyroxylin and a typical one of these new esters. All proportions are by weight.

*Lacquer film. Formula #1.*

| | Parts. |
|---|---|
| Pyroxylin | 3 |
| Ethoxyethyl butyl phthalate | 1 |

*Pyroxylin lacquer. Formula #2.*

| | Parts. |
|---|---|
| Pyroxylin | 3 |
| Ethoxyethyl butyl phthalate | 1 |
| Butyl acetate | 15 |
| Butanol | 5 |
| Ethyl acetate | 5 |
| Ethanol | 5 |
| Toluol | 20 |
| 58° Bé. naphtha | 10 |

*Pyroxylin and resin lacquer. Formula #3.*

| | Parts. |
|---|---|
| Formula #2 | 64 |
| Ester gum ("Paramet") | 2 |

*Pigmented lacquer. Formula #4.*

| | Parts. |
|---|---|
| Formula #3 | 66 |
| Zinc oxide | 1 |

By "alkoxyalkyl" as used in the specifications and claims we mean a monovalent group of atoms containing hydrogen, carbon, and oxygen, the one oxygen atom being linked, as an ether oxygen, between two carbon atoms, as in the ethoxyethyl radical,

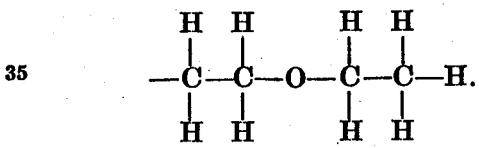

We claim:

1. An ester of a polycarboxylic acid in which the hydrogen of at least one of the carboxyl groups of the acid is replaced by an alkoxyalkyl radical that contains at least four carbon atoms.

2. An ester of a dicarboxylic acid in which the hydrogen of at least one of the carboxyl groups of the acid is replaced by an alkoxyalkyl radical that contains at least four carbon atoms.

3. An ester of a dicarboxylic aromatic acid in which the hydrogen of at least one of the carboxyl groups of the acid is replaced by an alkoxyalkyl radical that contains at least four carbon atoms.

4. An ester of a phthalic acid in which the hydrogen of at least one of the carboxyl groups of the acid is replaced by an alkoxyalkyl radical that contains at least four carbon atoms.

5. An ester of an ortho-phthalic acid in which the hydrogen of at least one of the carboxyl groups of the acid is replaced by an alkoxyalkyl radical that contains at least four carbon atoms.

6. An ester of a polycarboxylic acid in which the hydrogen of at least one of the carboxyl groups of the acid is replaced by an alkoxyalkyl radical and the hydrogen of another carboxyl group is replaced by an alkyl group.

7. An ester of a dicarboxylic acid in which the hydrogen of at least one of the carboxyl groups of the acid is replaced by an alkoxyalkyl radical and the hydrogen of the other carboxyl group is replaced by an alkyl group.

8. An ester of a dicarboxylic aromatic acid in which the hydrogen of at least one of the carboxyl groups of the acid is replaced by an alkoxyalkyl radical and the hydrogen of the other carboxyl group is replaced by an alkyl group.

9. An ester of a phthalic acid in which the hydrogen of at least one of the carboxyl groups of the acid is replaced by an alkoxyalkyl radical and the hydrogen of the other carboxyl group is replaced by an alkyl group.

10. An ester of ortho-phthalic acid in which the hydrogen of at least one of the carboxyl groups of the acid is replaced by an alkoxyalkyl radical and the hydrogen of the other carboxyl group is replaced by an alkyl group.

11. A composition of matter comprising the grouping of atoms represented by the formula

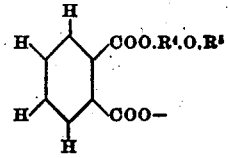

in which $R^4$ represents any divalent group of carbon and hydrogen atoms and $R^5$ any monovalent group of carbon and hydrogen atoms.

12. A composition of matter comprising the grouping of atoms as shown in claim 11, $R^4$ representing the group $-CH_2.CH_2-$ and $R^5$ any monovalent group of carbon and hydrogen atoms.

13. A composition of matter comprising the grouping of atoms shown in claim 11, $R^4$ representing the group $-CH_2.CH_2-$ and $R^5$ the ethyl radical, $-C_2H_5$.

14. A composition of matter comprising the grouping of atoms represented by the formula

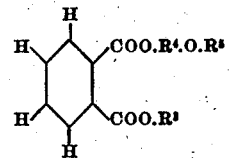

in which $R^4$ and $R^5$ represent, respectively, divalent and monovalent groups containing only carbon and hydrogen atoms and $R^3$ represents any monovalent radical containing only carbon and hydrogen atoms.

15. A composition of matter comprising the grouping of atoms represented by the following formula

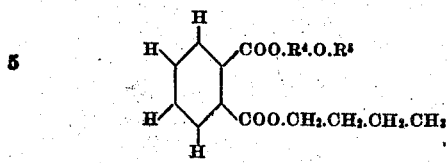

in which $R^4$ and $R^5$ represent divalent and monovalent groups, respectively, of carbon and hydrogen.

16. A composition of matter comprising the grouping of atoms represented by the formula

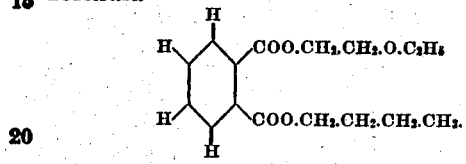

17. A composition of matter comprising ethoxyethyl butyl ortho-phthalate, a colorless liquid boiling at 182–5° C. at a pressure of approximately 5 mm. of mercury.

18. An ester of a polycarboxylic acid in which the hydrogen of at least one of the carboxyl groups is replaced by a monovalent group containing carbon and hydrogen atoms and only one oxygen atom, the oxygen atom being combined, in a so-called ether linkage, to carbon atoms of two radicals that contain each at least two carbon atoms.

19. An ester of a polycarboxylic acid in which the hydrogen of at least one of the carboxyl groups is replaced by monovalent group containing carbon and hydrogen atoms and only one oxygen atom, the oxygen atom being linked between two carbon atoms in a so-called ether linkage, and the hydrogen of another carboxyl group of the acid is replaced by a monovalent hydrocarbon radical.

20. An ester of a polycarboxylic acid in which the hydrogen of at least one of the carboxyl groups is replaced by a monovalent group containing carbon and hydrogen atoms and only one oxygen atom, the oxygen atom being linked between two carbon atoms in a so-called ether linkage and the hydrogen of another carboxyl group of the acid is replaced by an alkyl group.

ROBERT H. VAN SCHAACK, Jr.
ROBERT CALVERT.